United States Patent [19]

Geddes et al.

[11] 4,051,539
[45] Sept. 27, 1977

[54] DIFFERENTIAL DURATION DEMULTIPLEXING METHOD AND SYSTEM

[75] Inventors: Leslie A. Geddes; Joe D. Bourland, both of W. Lafayette, Ind.

[73] Assignee: Purdue Research Foundation, West Lafayette, Ind.

[21] Appl. No.: 681,832

[22] Filed: Apr. 30, 1976

[51] Int. Cl.[2] .............................................. G11B 5/02
[52] U.S. Cl. ................................. 360/44; 179/15 AW
[58] Field of Search ............... 179/15 AW; 329/106; 330/125; 360/44, 50

[56] References Cited
U.S. PATENT DOCUMENTS 3,720,927  3/1973  Wolf ................................... 360/44

Primary Examiner—Vincent P. Canney
Attorney, Agent, or Firm—John R. Nesbitt

[57] ABSTRACT

A demultiplexing method and system is disclosed utilizing a differential duration technique. Data that have been conventionally encoded utilizing a technique wherein variations in time contain the essential information, such as can be accomplished by systems wherein data are encoded by modulating either the spacing between pulses or the width of the pulses, is decoded by differential duration demultiplexing to reduce errors caused by time distortion introduced prior to recovery of the data. Time distortion errors are reduced by sensing both the pulses and intervals following the pulses in the data train and deriving decoded data from the difference therebetween.

5 Claims, 4 Drawing Figures

DIFFERENTIAL DURATION DEMULTIPLEXING METHOD AND SYSTEM

FIELD OF THE INVENTION

This invention relates to a demultiplexing method and system and more particularly relates to a demultiplexing method and system utilizing a differential duration technique.

BACKGROUND OF THE INVENTION

It has heretofore become well known to provide a system for encoding data prior to transmission and then decoding the same after transmission to recover the data and hence facilitate the orderly transmission of intelligible information. It has likewise heretofore become well known to store encoded information either before, after, or as a part of, transmission and then recover the same as needed or desired.

Included among such systems are systems that utilize pulse width modulation as well as systems that modulate the spacing between the pulses for data encoding purposes. The encoded data are then demodulated after transmission and heretofore such demodulation has commonly been carried out by use of a conventional unit such as, for example, a conventional pulse-width demodulator or demultiplexer.

However, it has been found that the transmission channel can impose a time distortion that can make it difficult or, in some instances, impossible to recover the data from an encoded data train. If the data are recorded on magnetic tape, for example, speed variations in the tape will alter the time relation between the pulses, or parts of a pulse or pulses, that contain the encoded data. In like manner, in wireless transmission, variations in path length for the radio frequency waves between the point of transmission and reception can alter the temporal relations between the pulses that contain the encoded data.

SUMMARY OF THE INVENTION

This invention provides a method and system for reducing encoded data errors that occur due to time distortions introduced prior to recovery of the data decoding. The method and system of this invention reduces time distortion errors by sensing both the pulses and intervals following the pulses for each channel of data included in a data train and deriving the encoded data for each channel from the difference between the pulses and intervals included in the data for each channel.

It is therefore an object of this invention to provide an improved demultiplexing method and system.

It is another object of this invention to provide an improved demultiplexing method and system that reduces encoded data errors that occur due to introduced time distortions.

It is yet another object of this invention to provide an improved demultiplexing method and system that utilizes a differential duration technique to reduce time distortion errors.

It is yet another object of this invention to provide a novel differential duration demultiplexing method and system.

It is yet another object of this invention to provide a novel differential duration demultiplexing method and system wherein pulses and intervals following pulses in a data train are sensed and the difference therebetween established to provide decoded data.

It is still another object of this invention to provide a novel method for demultiplexing that includes sensing the pulses and intervals following the pulses and deriving from the difference therebetween decoded data.

It is yet another object of this invention to provide a novel system for demultiplexing that includes means for detecting the leading and trailing edges of pulses as well as processing circuitry to determine therefrom the width of both pulses and intervals between pulses and deriving therefrom the difference therebetween, which difference provides a decoded data output.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

While errors due to time distortion can occur in a number of ways as indicated hereinabove, a specific example (that is, varying tape speed of a tape recorder having pulse width modulation utilized to encode data on the magnetic tape) has been utilized hereinafter in order to better explain the invention. It is to be realized, however, that the invention is not meant to be limited to this one specific example.

As is well known, magnetic tape maybe used as the medium on which data are encoded by either modulating the spacing between pulses or modulating the width. Replay of the tape at the original tape speed allows reproduction of the same time separation between pulses or the same width as was present at the original time of recording. However, if the speed of the magnetic tape changes during replay, there will occur a distortion in the temporal spacing and width of each data pulse. The method and system of this invention reduces such distortion encountered while recovering the data.

Figure 1:
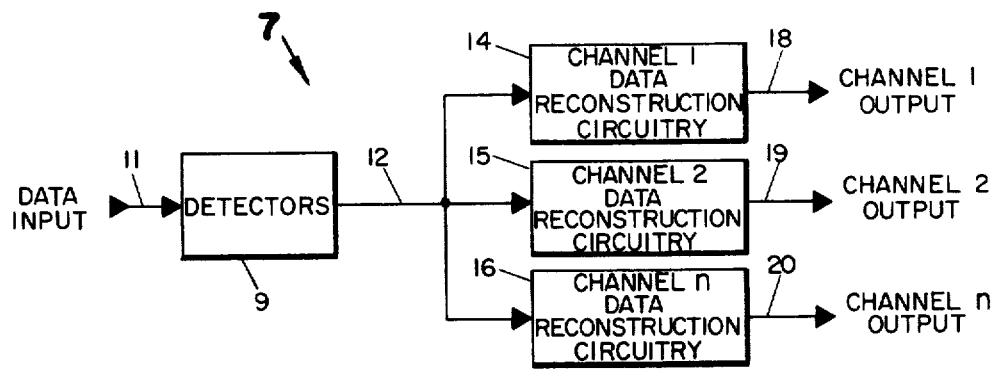
FIG. 1 is a block diagram of the differential duration demultiplexing system of this invention shown for decoding a plurality of channels.

As shown in FIG. 1, the differential duration demultiplexing system 7 of this invention includes a plurality of detectors 9 receiving data input on lead 11. As suggested by the example set forth hereinabove, such input can be a data train output from a tape recorder (not shown).

The output from detectors 9 is coupled on lead 12 (commonly a multi-wire lead) to data reconstruction circuitry for each channel included in the data train. As indicated in FIG. 1, the detector output can be coupled to channel 1 data reconstruction circuitry 14, channel 2 data reconstruction circuitry 15, and channel n data reconstruction circuitry 16 with the channel 1 output being provided on lead 18, the channel 2 output being provided on lead 19, and the channel n output being provided on lead 20. Thus, recovered data for each channel may be separately provided for utilization in a conventional manner.

Figure 2:
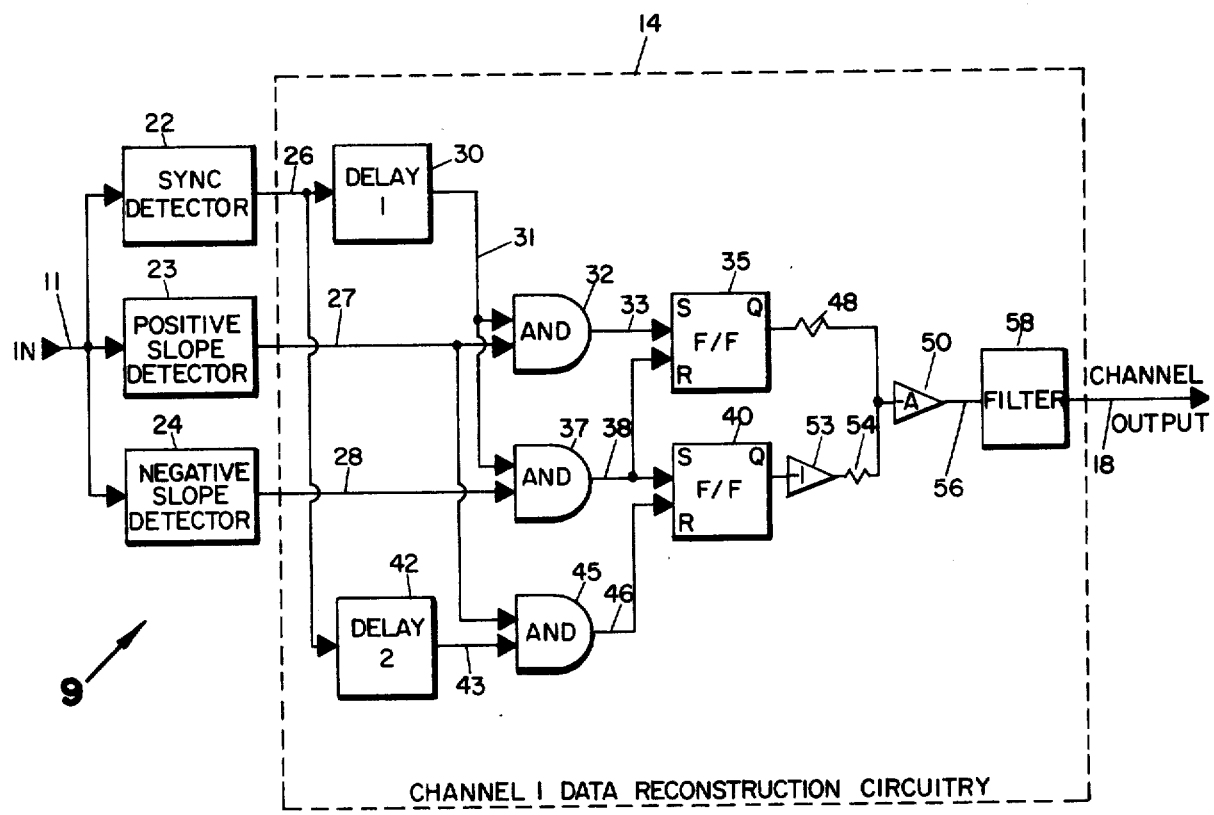
FIG. 2 is an expanded block diagram of the differential duration demultiplexing system of this invention showing the detectors and data reconstruction circuitry in detail.

The structure utilized for implementation of the system may vary as could be obvious to one skilled in the art. FIG. 2, however, shows in block form, one implementation for decoding data in accordance with this invention, i.e., through the use of a differential duration demultiplexing technique. In FIG. 2, only the structure of the data reconstruction circuitry for one channel has been illustrated, and it is to be realized that the data reconstructon circuitry for the other channels can be the same with appropriate delays being utilized as is necessary for the positioning of the channel in the data train.

As shown in FIG. 2, the data are provided to the system (to detectors 9) on lead 11. As shown, the input signal is coupled to sync detector 22, positive slope detector 23, and negative slope detector 24. Sync detector 22 is utilized to sense the synchronization pulses in the data train signal, while the positive and negative slope detectors sense the leading and trailing edges of the pulses of the data train and provide an output indicative thereof in conventional manner.

The outputs from the detectors are coupled to the data reconstruction circuitry (on multi-wire lead 12 as indicated in FIG. 1). As specifically shown in FIG. 2, the output from sync detector 22 is coupled to the data reconstruction circuitry 14 (channel 1) on lead 26, the output from positive slope detector 23 is coupled to circuitry 14 on lead 27, and the output from negative slope detector 24 is coupled to circuitry 14 on lead 28.

Lead 26 is connected with a first delay 30, the output from which is coupled by lead 31 to one point of AND gate 32, which gate receives a second input from the positive slope detector on lead 27. The output from AND gate 32 is connected by lead 33 to the set input of flip-flop 35. Lead 31 is also connected to an input of AND gate 37, which gate receives a second input from the negative slope detector on lead 28. The output of AND gate 37 is connected by lead 38 to the reset input of flip-flop 35 and to the set input of flip-flop 40.

The output from sync detector 22 is also coupled to a second delay 42 the output of which is coupled by a second delay 42, the output of which is coupled to a second delay 42 the output of which is coupled by lead 43 to one input of AND gate 45, which gate receives a second input from positive slope detector 23 on lead 27. The output from gate 45 is coupled on lead 46 to the reset input of flip-flop 40.

The output from sync detector 22 is also coupled by lead 43 to one input of AND gate 45, which gate receives a second input from positive slope detector 23 on lead 27. The output from gate 45 is coupled on lead 46 to the reset input of flip-flop 40.

The Q output of flip-flop 35 is coupled through resistor 48 to an amplifier 50. The Q output of flip-flop 40 is coupled through inverting amplifier 53 and resistor 54 to amplifier 50 so that amplifier 50 provides an output signal that is the difference between the outputs of flip-flops 35 and 40. The output from amplifier 50 is coupled on lead 56 to filter 58, the output from which provides the decoded data output (on lead 18 for channel 1 as indicated in FIGS. 1 and 2).

As can be appreciated, the delays 30 and 42 are selected as needed to delay the signal for timing purposes. Upon receipt of an output from delay 30 and from positive slope detector 23, AND gate 32 provides an output to set flip-flop 35. Flip-flop 35 is reset when AND gate 37 receives an output from delay 30 coincidently an output from negative slope detector 24. When flip-flop 35 is reset, flip-flop 40 is set by the output from AND gate 37. Flip-flop 40 is then reset when AND gate 45 receives an output from delay 42 and positive slope detector 23.

Thus, flip-flop 35 senses the width of the pulse (since the flip-flop is set at the start of the pulse and reset at the end of the pulse) and flip-flop 40 senses the width of the interval between pulses (since the flip-flop is set at the end of the pulse and reset at the start of a new pulse). The difference between the signals from flip-flops 35 and 40 is then established by coupling them (with one inverted) to amplifier 50.

Figure 3:
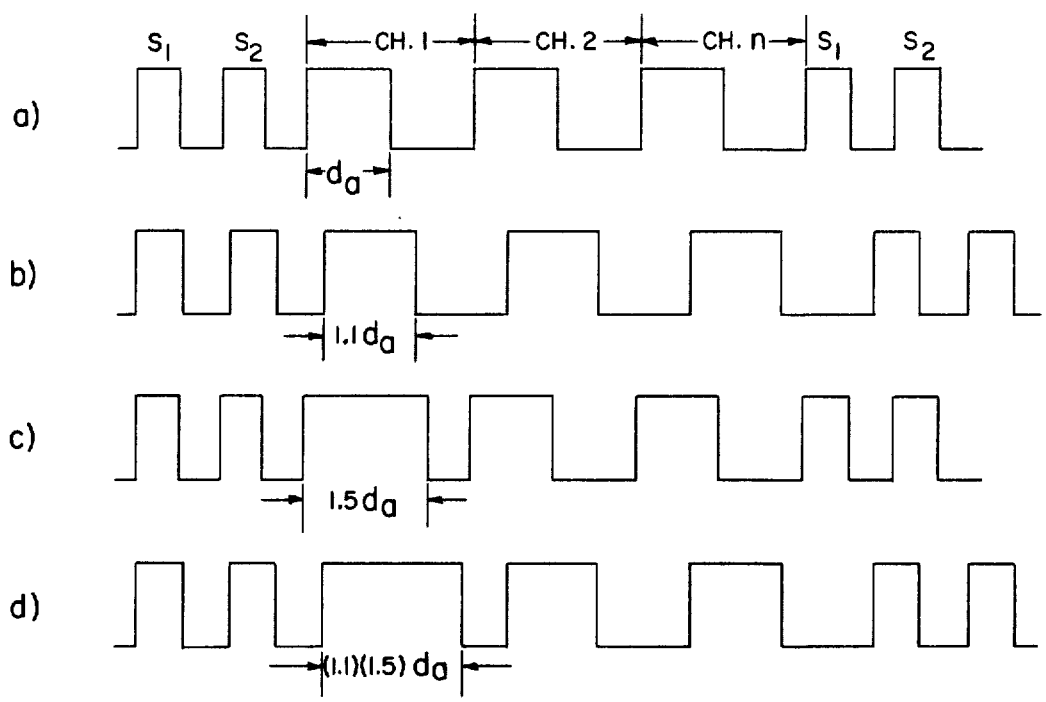
FIG. 3 shows typical data train wave forms to illustrate operation of a conventional demultiplexing system under varying operating conditions.
Figure 4:
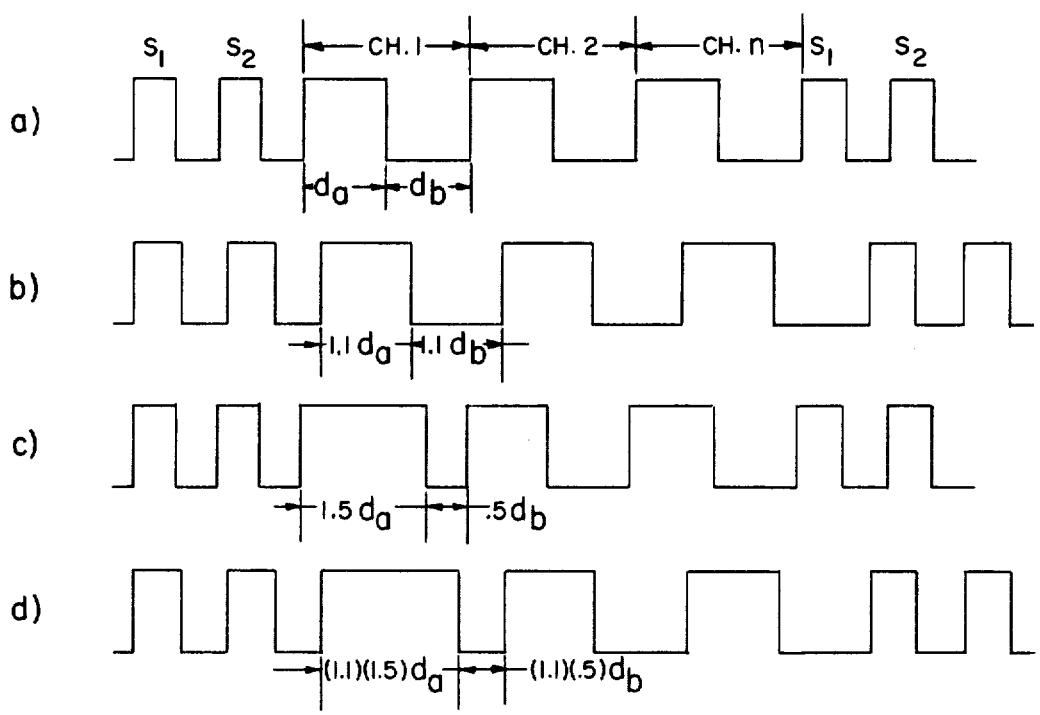
FIG. 4 shows typical data train wave forms to illustrate operation of the differential duration demultiplexing system of this invention under varying operating conditions similar to those described in connection with FIG. 3.

FIGS. 3 and 4 illustrate typical three-channel data trains in which the widths of pulses for channel 1, channel 2, and channel n contain the encoded information of two pulses $S_1$ and $S_2$ are synchronizing pulses which instruct the demultiplexing system to examine the width of each data pulse for the information contained therein. FIG. 3 illustrates typical results utilizing a conventional demultiplexing unit, while FIG. 4 illustrates typical results utilizing the differential duration demultiplexing system of this invention. In order to better demonstrate how this invention reduces noise and distortion as compared to a conventional unit, four cases, or examples, have been analyzed. The analysis describes the recovery of data from a single channel (channel 1) in the data train, but it is to be realized, of course, that data in other channels can be recovered in the same manner.

As shown in FIGS. 3 and 4, $a$ of each figure shows recovery of data with the original tape speed, without data applied to the channel, $b$ of each figure shows recovery of data with a 10% decrease in tape speed without data, $c$ of each figure shows recovery of data with a maximum signal applied to the channel and replay with the original tape speed, and $d$ of each figure shows recovery of data with a maximum signal applied to the channel at a 10% decrease in tape speed.

With conventional pulse-width modulation, recovery of the data is achieved by detecting the average value of the train of pulses containing the data. Thus, for channel 1, the data are contained in the width of the pulse ($d_a$) as shown in FIG. 3(a). In the recovery (demultiplexing) system, the output ($e_o$) will be the average amplitude of the train of pulses of constant height and width $d_a$. If the interpreting or averaging constant is A, then $e_o = Ad_a$ for the illustration as shown in FIG. 3(a).

If the tape speed is decreased by b 10%, however, this will lengthen the width of $d_a$ by 10%. Therefore, the recovered signal $e_o = 1.1Ad_a$ as shown in FIG. 3(b). As can be seen from a comparison of FIG. 3(a) and FIG. 3(b), a 10% reduction in tape speed provides an increase in output from the conventional demultiplexer, despite the fact that no signal was applied to modulate the width of $d_a$.

FIG. 3(c) shows recovery of data with the original tape speed and with a maximum positive signal applied to $d_a$. In this situation, the output of the conventional demultiplexer will be proportional to the width of $d_a$, which has been increased by 50%. Therefore, $e_o =$ A $1.5d_a$ as shown by FIG. 3(c) and the data have been recovered accurately (since tape speed was held constant).

As shown in FIG. 3(d), a conventional demultiplexing system with maximum amplitude signal applied and 10% decrease in tape speed will have an output from the demultiplexer of $e_o = (1.1)(1.5)d_a$A. As in the example of FIG. 3(b), an increase in output is included due to the decrease in tape speed and hence a time distortion error has been introduced.

Thus, with a conventional demultiplexing system that provides an output proportional to the width of the encoded data pulse, the following occurs:

1. With the original tape speed and no data applied, there is a steady output which corresponds to the no-signal situation;

2. With an encoded signal, and replay of the tape with the original tape speed, the data are recovered accurately;

3. With no encoded signal and a decrease (or increase) in tape speed, there is an output that is indistinguishable from data; and 4 With an encoded signal and a decrease (or increase) in tape speed, the recovered data is altered in proportion to the change in the tape speed.

The same examples as set forth hereinabove have been utilized to illustrate the operation of the differential duration demultiplexing system of this invention as shown in FIG. 4. Essentially the differential duration demultiplexing system of this invention employs the difference in the durations of the data pulse ($d_a$) and the interval following it ($d_b$) which extends to the leading edge of the next pulse. (For the last data channel, i.e. n in FIG. 4, the leading edge of sync pulse $S_1$, provides the time reference for the width of $d_b$).

During replay with the original tape speed and no encoded data, the output from channel 1 of the demultiplexer is derived from the difference between $d_a$ and $d_b$, i.e., $e_o =$ A($d_a - 31 d_b$) = 0 as shown by FIG. 4(a).

With a 10% reduction in tape speed, both $d_a$ and $d_b$ are increased by 10%. Therefore the output of the demultiplexer $e_o = (1.1d_a - 1.1d_b)$ which is also zero as shown by FIG. 4(b).

With a maximum amplitude signal applied to channel 1 and replay with the original tape speed, $d_a$(max) = $1.5d_a$ and $d_b$ is reduced by 50%. Therefore, the output ($e_0$) from the demultiplxer is $e_o = (1.5d_a - .5 d_b)$A = $d_a$A as shown in FIG. 4(c).

With maximum amplitude signal applied to channel 1 and replay with a reduction in tape speed, both $d_a$ and $d_b$ are lengthened by 10%, and have the values $(1.1)(1.5)d_a$ and $(1.1)(.5)d_b$, respectively. The output from the demultiplexer is thus: $e_o = [((1.1)(1.5)d_a - (1.1)(.5)d_b)]$A as shown by FIG. 4(d).

The results from analyzing these four examples for conventional pulse width modulation and the differential duration demultiplexing system of this invention (DDDS) are shown in Table 1.

TABLE 1

| SYSTEM | EXAMPLE | OUTPUT |
|---|---|---|
| Conventional Demultiplexing | 1. NO DATA AND ORIGINAL SPEED | $d_a$A |
| Conventional Demultiplexing | 2. NO DATA AND REDUCED SPEED | 1.1 $d_a$A |
| Conventional Demultiplexing | 3. DATA AND ORIGINAL SPEED | 1.5 $d_a$A |
| Conventional Demultiplexing | 4. DATA AND REDUCED SPEED | $(1.1)(1.5)d_a$A |
| DDDS | 1. NO DATA AND ORIGINAL SPEED | 0 |
| DDDS | 2. NO DATA AND REDUCED SPEED | 0 |
| DDDS | 3. DATA AND ORIGINAL SPEED | $A(1.5d_a - .5d_b) = d_a$A |
| DDDS | 4. DATA AND REDUCED SPEED | $A[(1.1)(1.5)d_a - (1.1)(.5)d_b] = 1.1d_a$A |

From this analysis, it can be seen that the outstanding difference between the invention and the conventional system is seen when no data are encoded and there occurs a difference in tape speed during replay. With the conventional demultiplexing system, the output is a constant signal with a constant tape speed. With a change in tape speed, this output changes, appearing as if it was an encoded signal. With the system of the invention, the output is zero and remains zero in the presence of a change in tape speed. Thus, when graphic recording is used to display the output of the system of this invention, a clean and even baseline is reproduced despite variations in tape speed. With conventional demultiplexing systems, the baseline shifts in accordance with variations in tape speed. In practical systems, there are rythmic variations in tape speed called flutter. When present, the flutter modulates the baseline of recorders connected with conventional demultiplexing systems. The system of this invention eliminates this type of noise.

When tape speed variations occur with a maximum amplitude signal speed variations provide equal distortion with conventional and the system of this invention. Thus, the reduction in distortion is optimum under the zero-signal condition. The analysis was based on an incremental change in tape speed. In a typical replay situation, tape speed, however, usually varies in a complex manner. In such a case, practical experience with the system of this invention has shown that the noise reduction provided by this invention for large-amplitude signals is not significantly different than that for small-amplitude signals. In fact, it has been found that for maximum-amplitude encoded signals, the system of this invention provides a noise reduction factor of about two when compared to conventional pulse-width demultiplexing systems.

As can be seen from the foregoing, this invention provides a demultiplexing system and method that reduces distortion through the use of differential duration demultiplexing.

What is claimed is:

1. A method for demultiplexing a pulse train signal reflecting data encoded through utilization of a time variable technique, said method comprising:

receiving said pulse train signal;

determining through the use of gating and a first multivibrator the time of presence of a pulse in a predetermined portion of said pulse train and providing an output indicative thereof from the first multivibrator;

determining through the use of gating and a second multivibrator the time of absence of a pulse in said predetermined portion of said pulse train and providing an output indicative thereof from the second multivibrator;

comparing the determined time of presence with the determined time of absence of said pulse by comparing the outputs from said first and second multivibrators; and providing an output signal based upon said comparison that is indicative of said data carried by said pulse train signal.

2. A method for demultiplexing by differential duration a transmitted data-carrying signal encoded through utilization of a time variable technique to form a pulse train reflecting said data, said method comprising:

receiving said transmitted data-carrying signal;

determining through the use of gating and first and second multivibrators the time of presence and the time of absence of a pulse in a predetermined portion of said received data-carrying signal and providing separate outputs indicative thereof from the first and second multivibrators;

comparing said predetermined time of presence of said pulse with said determined time of absence of said pulse and determining the difference therebetween by comparing the outputs from said first and second multivibrators; and providing an output based upon said determind difference, said output being indicative of said data carried by said data-carrying signal and having reduced distortion arising from time distortions imposed during transmission of said data-carrying signal.

3. The method of claim 2 wherein said data-carrying signal includes a plurality of timewise spaced channels for carrying data, and wherein said method includes determining the time of presence and the time of absence of a pulse in each of said channels so that an output indicative of data is provided for each channel of said data-carrying signal.

4. A system for demultiplexing by differential duration of data-carrying signal that includes a pulse train reflecting data encoded through utilization of a time variable technique, said system comprising:

means for receiving said data-carrying signal;

detector means connected with said receiving means and providing outputs indicative of said leading and trailing edges of a pulse detected in a predetermined portion of said data-carrying signal; and data reconstruction circuitry means including gating means connected with said detector means to receive said outputs therefrom, said data reconstruction circuitry means also including first multivibrator means connected with said gating means and providing an output indicative of the duration of a pulse and second multivibrator means connected with said gating means and providing an output indicative of the time of absence of a pulse within said predetermined period of time, and said data reconstruction circuitry means also including comparison means connected with said first and second multivibrator means to receive said outputs therefrom and responsive thereto providing an output that is the difference therebetween, said provided output being indicative of the data carried by said predetermined portion of said data-carrying signal.

5. The system of claim 4 wherein said system includes a plurality of data reconstruction circuitry means connected with said detector means whereby a data-carrying signal with a plurality of timewise spaced channels can be demultiplexed and separate outputs provided for each channel.

* * * * *